(12) United States Patent
Kooiker

(10) Patent No.: US 6,352,296 B1
(45) Date of Patent: Mar. 5, 2002

(54) FOLDING COVER FOR PICKUP TRUCK BED

(75) Inventor: John D. Kooiker, Caledonia, MI (US)

(73) Assignee: Advance Cover Company, Grand Rapids, MI (US)

(*) Notice: Subject to any disclaimer, the term of this patent is extended or adjusted under 35 U.S.C. 154(b) by 0 days.

(21) Appl. No.: 09/715,407

(22) Filed: Nov. 17, 2000

Related U.S. Application Data

(63) Continuation-in-part of application No. 09/067,668, filed on Apr. 28, 1998, now abandoned.

(51) Int. Cl.[7] ................................................ B60P 7/08
(52) U.S. Cl. ......................... 296/100.06; 296/100.09; 296/100.07
(58) Field of Search ...................... 296/100.09, 100.06, 296/100.07; 160/187, 213, 229.1

(56) References Cited

U.S. PATENT DOCUMENTS

| | | |
|---|---|---|
| 3,300,265 A | 1/1967 | Wilmer et al. |
| 3,416,835 A | 12/1968 | Ohle |
| 3,512,828 A | 5/1970 | Craft |
| 3,649,072 A | 3/1972 | Cross |
| 3,768,858 A | 10/1973 | Boismier |
| 3,833,255 A | 9/1974 | Logue |
| 3,923,334 A | 12/1975 | Key |
| 3,986,749 A | 10/1976 | Hull et al. |
| 4,199,188 A | 4/1980 | Albrecht et al. |
| 4,221,423 A | 9/1980 | Stone |
| 4,313,636 A | 2/1982 | Deeds |
| 4,406,493 A | 9/1983 | Albrecht et al. |
| 4,418,954 A | 12/1983 | Buckley |
| 4,522,440 A | 6/1985 | Gostomski |
| 4,651,540 A | 3/1987 | Rana |
| 4,747,441 A | 5/1988 | Apolzer et al. |
| 4,824,162 A | 4/1989 | Geisler et al. |
| 4,844,531 A | 7/1989 | Kooiker |
| 4,861,092 A | 8/1989 | Bogard |
| 4,946,217 A | 8/1990 | Steffens et al. |
| 5,018,777 A | 5/1991 | Swenson |
| 5,087,093 A | 2/1992 | Repetti |
| 5,427,428 A | 6/1995 | Ericson et al. |
| 5,595,417 A | 1/1997 | Thoman et al. |
| 5,636,893 A | 6/1997 | Wheatley |
| 5,653,491 A | 8/1997 | Steffens et al. |
| 5,931,521 A | 8/1999 | Kooiker |
| 6,000,744 A | 12/1999 | Kooiker |

Primary Examiner—Joseph D. Pape
(74) Attorney, Agent, or Firm—Waters & Morse P.C.; John A. Waters

(57) ABSTRACT

A folding cover for a pickup truck bed comprises at least two panels pivotally connected together. An attachment mechanism for the cover restrains the cover from sliding on the pickup truck bed while permitting both panels to be opened. The attachment mechanism comprises a track and follower mechanism interconnecting one panel with the bed, the track and follower mechanism defining an arcuate path that generally follows the arc of a circle having the panel hinge axis as a central axis. One of a track and follower is attached to the pickup truck bed and the other of the track and follower comprises either one element attached to one of the panels or separate elements attached to each of the panels, the track and follower fitting together such that the follower is constrained to follow the arcuate path between open and closed positions of the panel. The gap between adjacent panels in the cover is sealed from moisture penetration by a unique S-shaped or accordion-shaped seal, which is attached on one end to the edge of one panel and is attached at the other end to the edge of the adjacent panel, preferably by a pressure-sensitive adhesive. The seal expands and collapses in accordion fashion as the panels are pivoted relative to each other, and when the panels lay flat on the pickup truck bed, the seal fills the space between the panels and forms an enlarged bead above the junction between the panels. An improved panel latch mechanism for the cover serves both as a latch for the rearmost panel and as a latch to hold the panels together when they are folded in a stack at the front of the pickup truck bed.

5 Claims, 18 Drawing Sheets

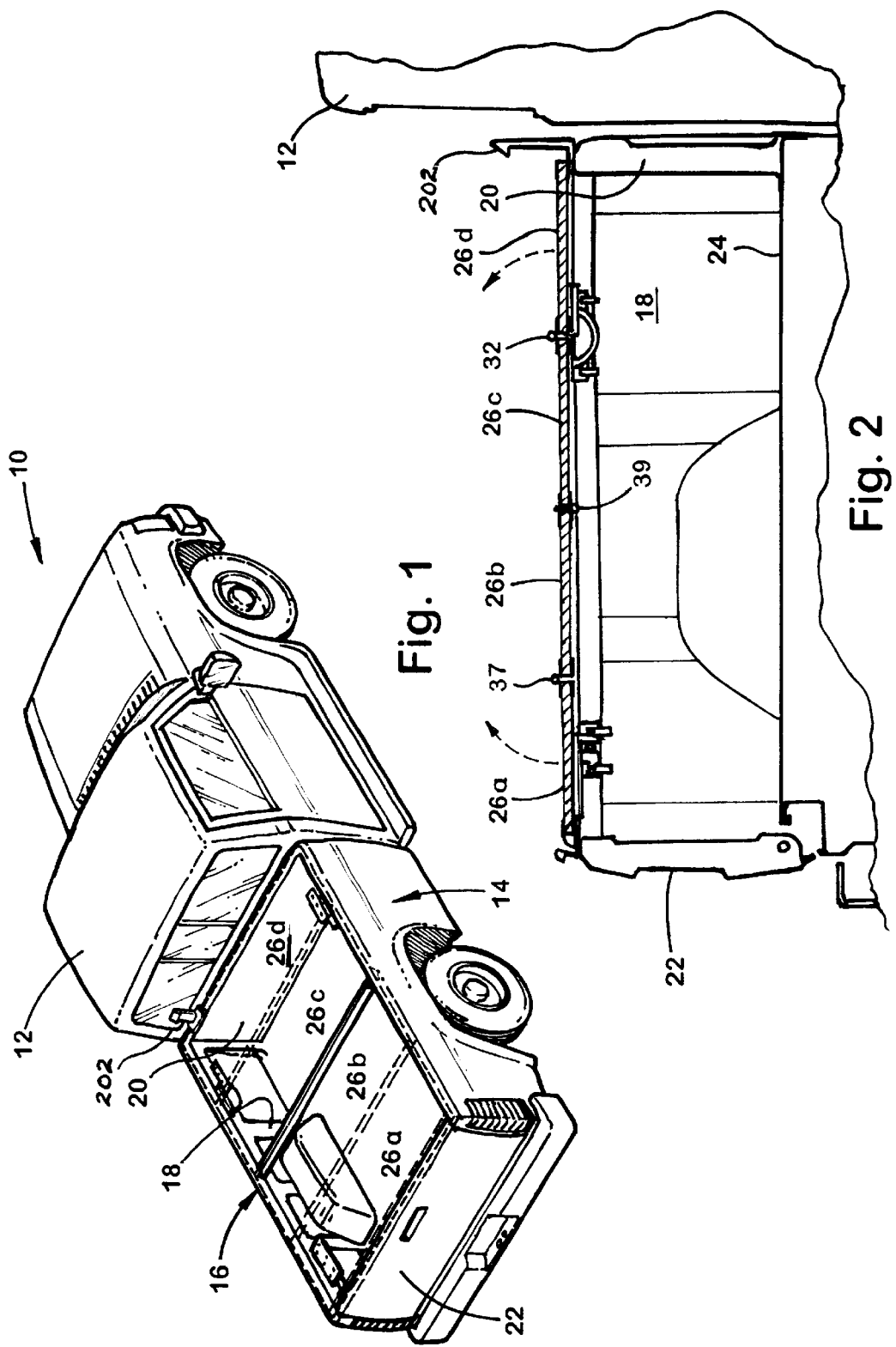

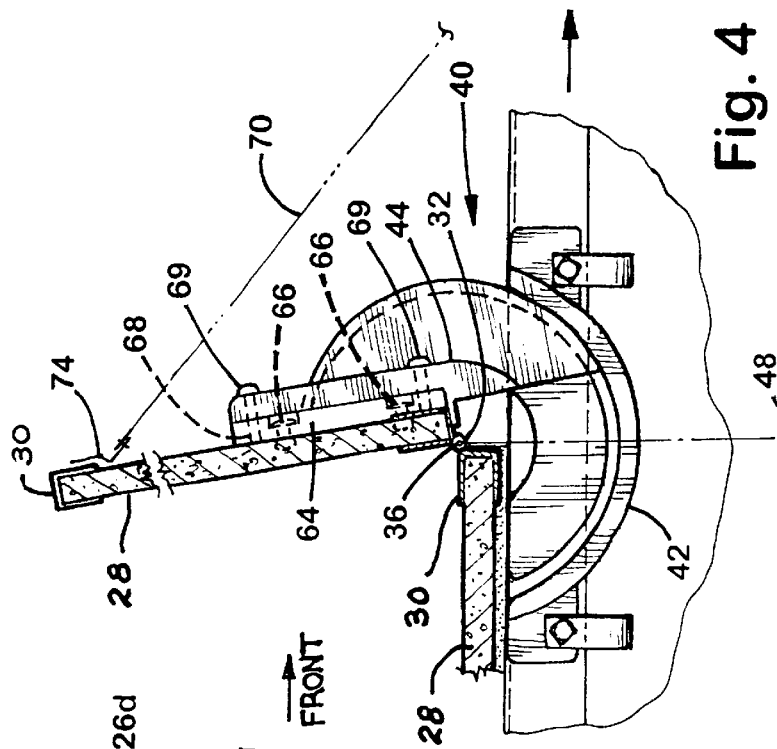
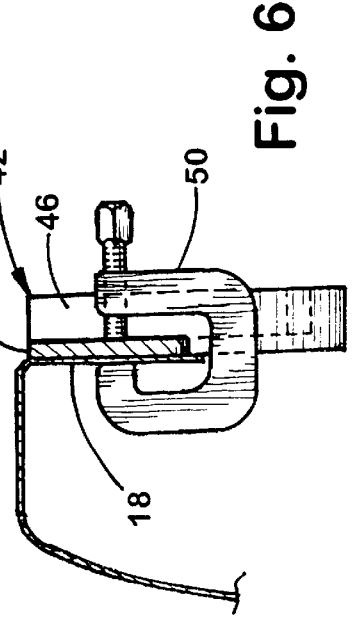
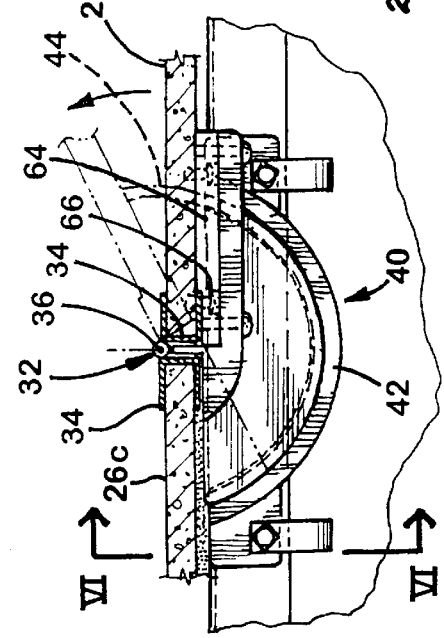
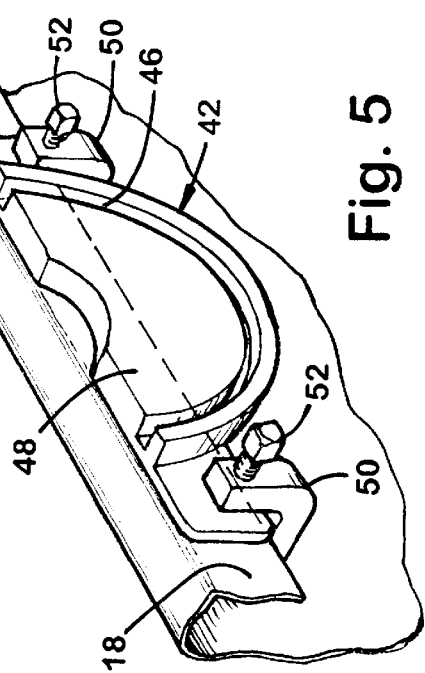
Fig. 3
Fig. 4
Fig. 5
Fig. 6

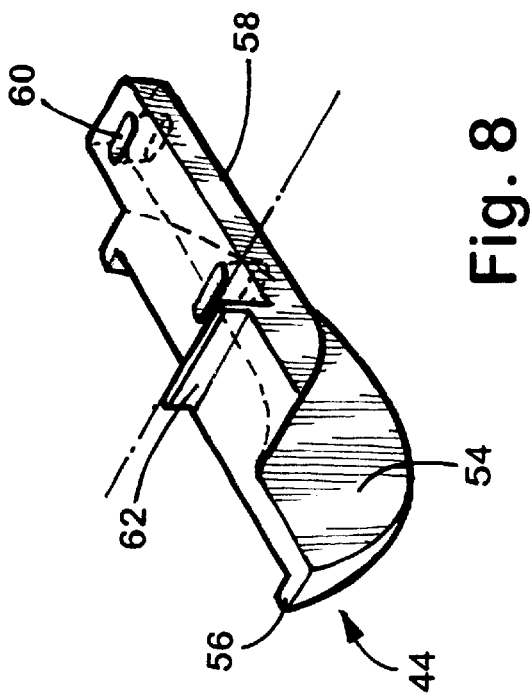
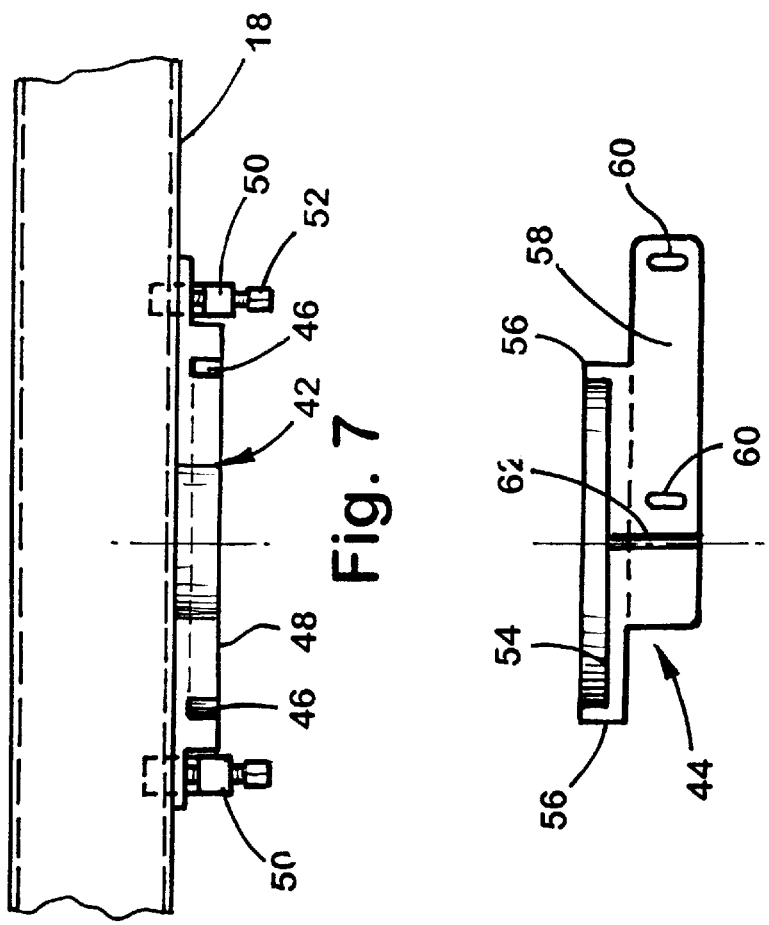

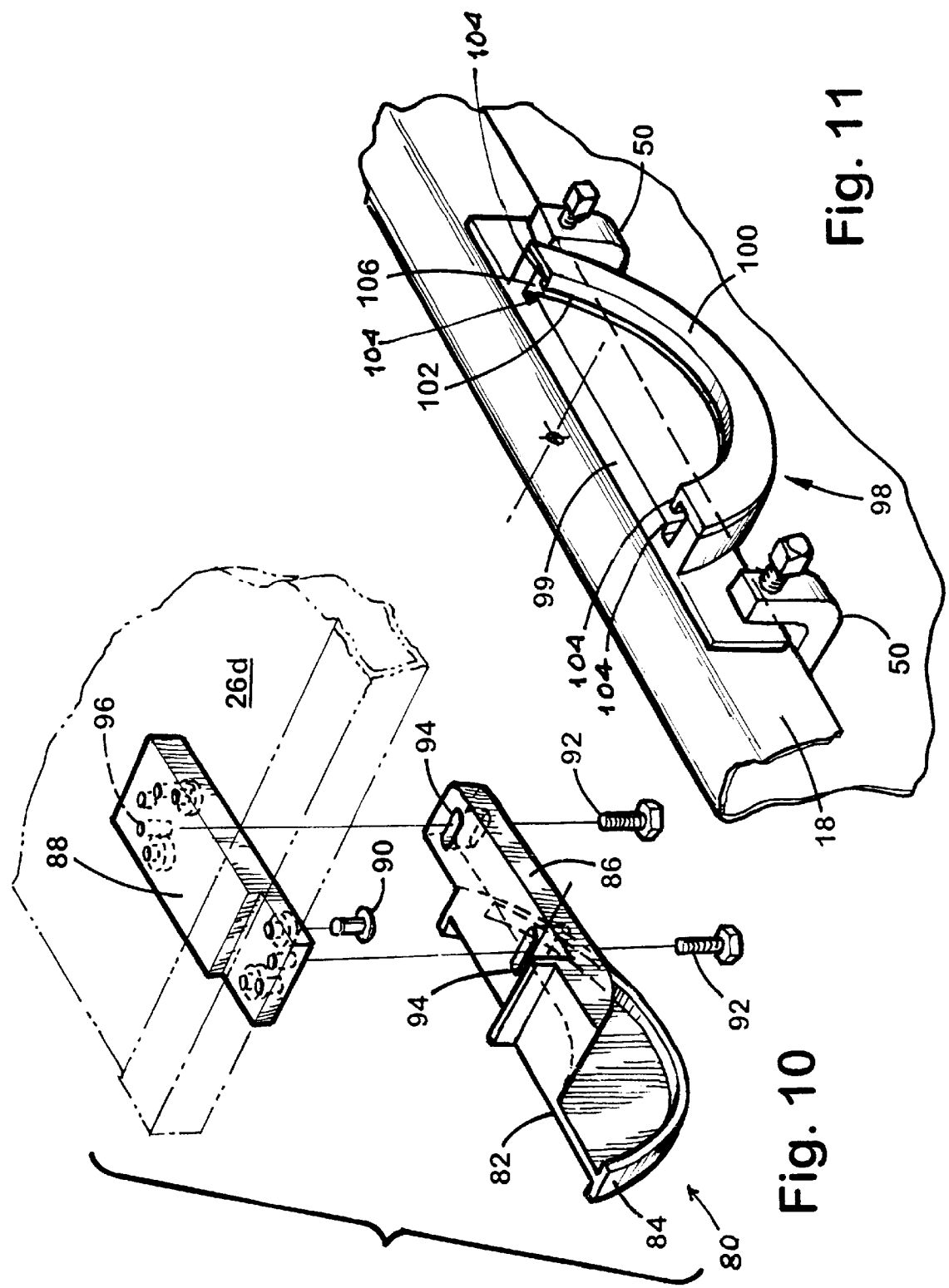

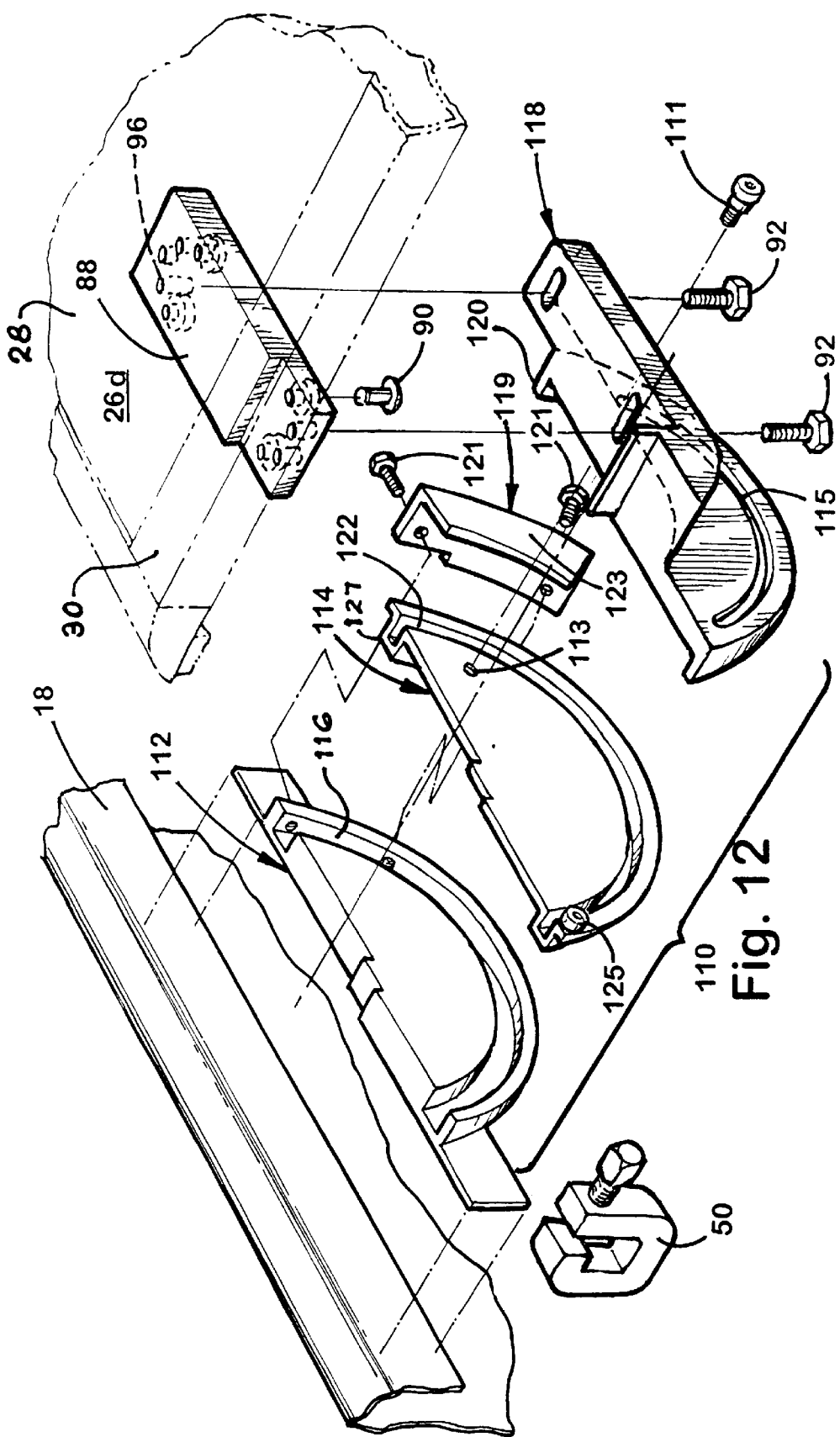

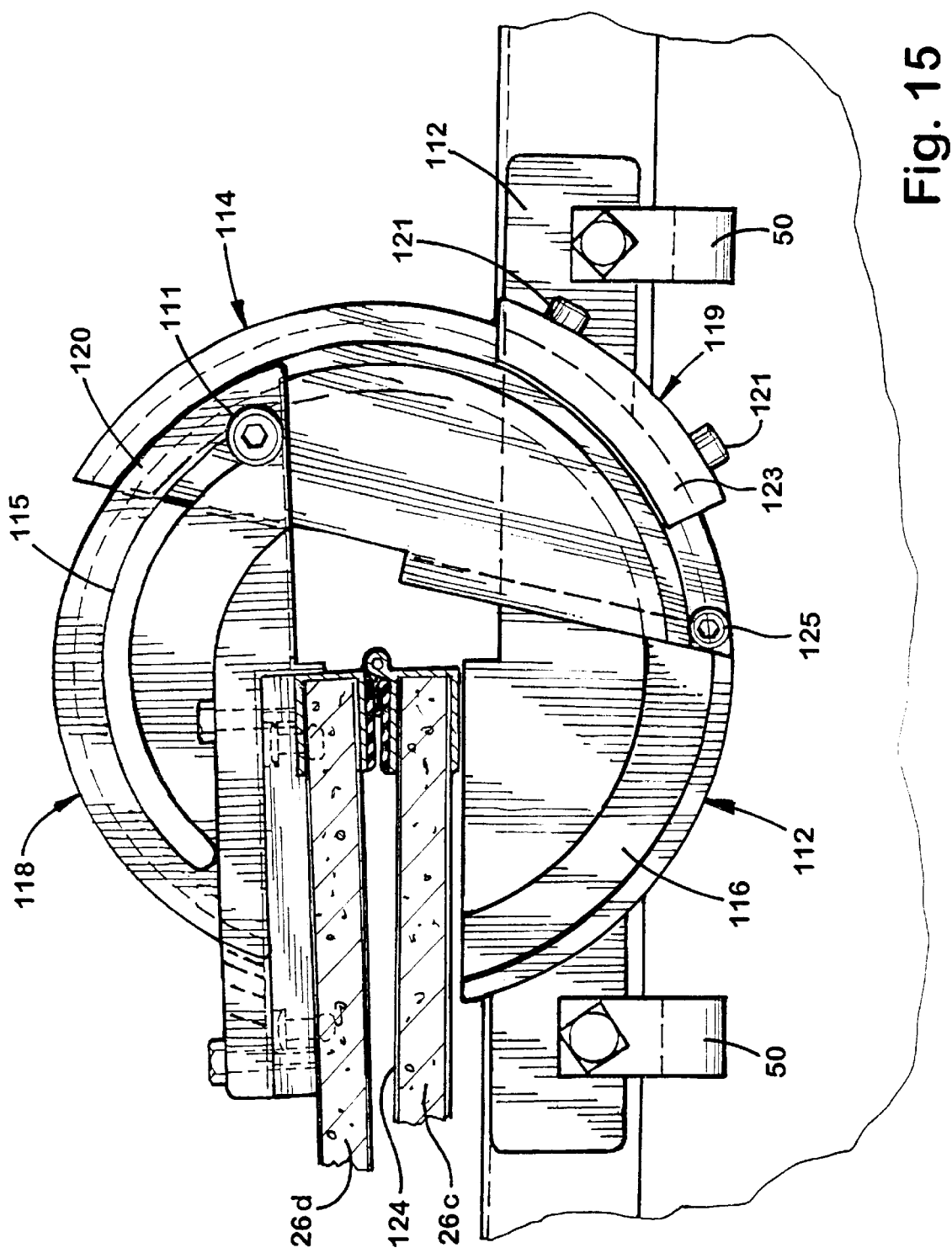

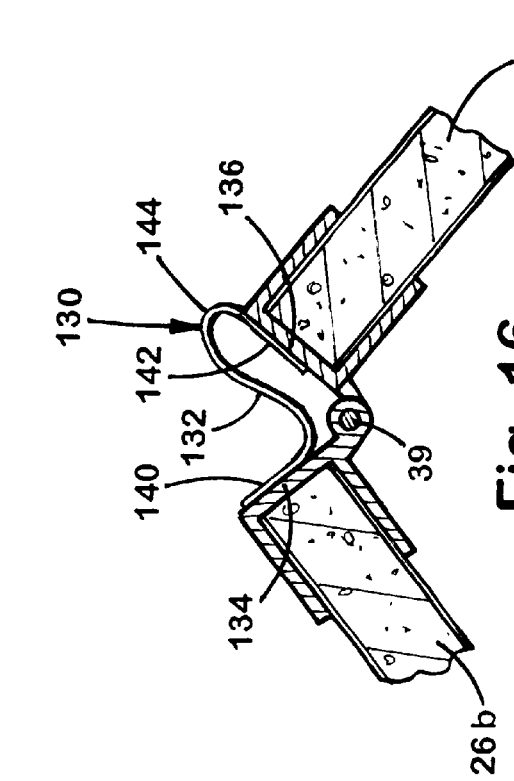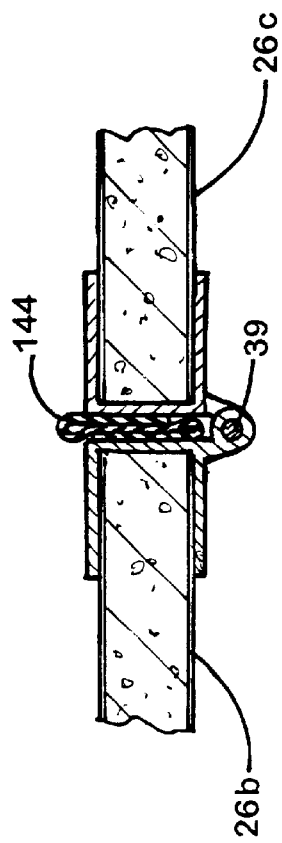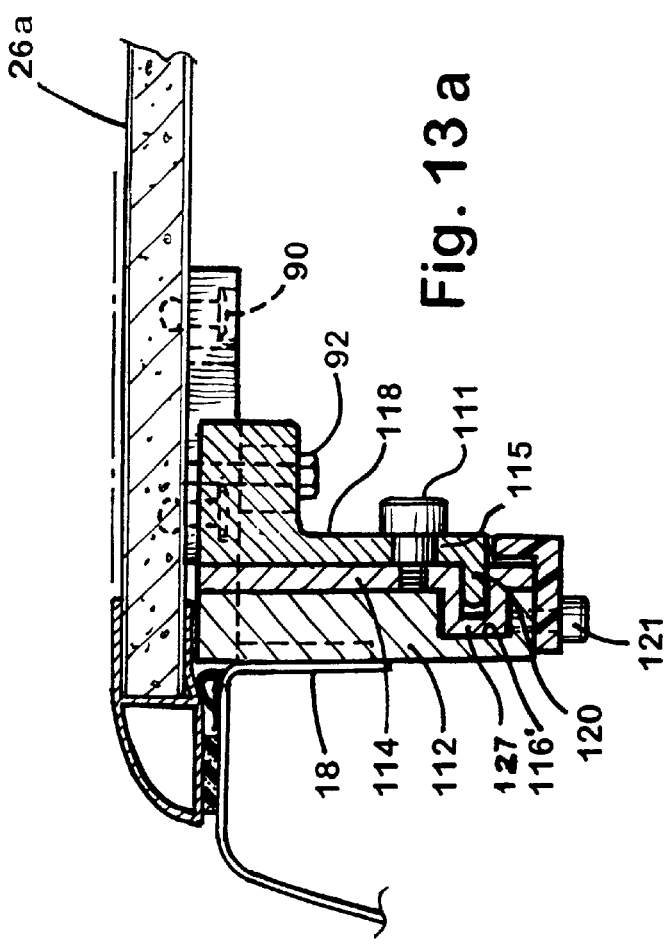

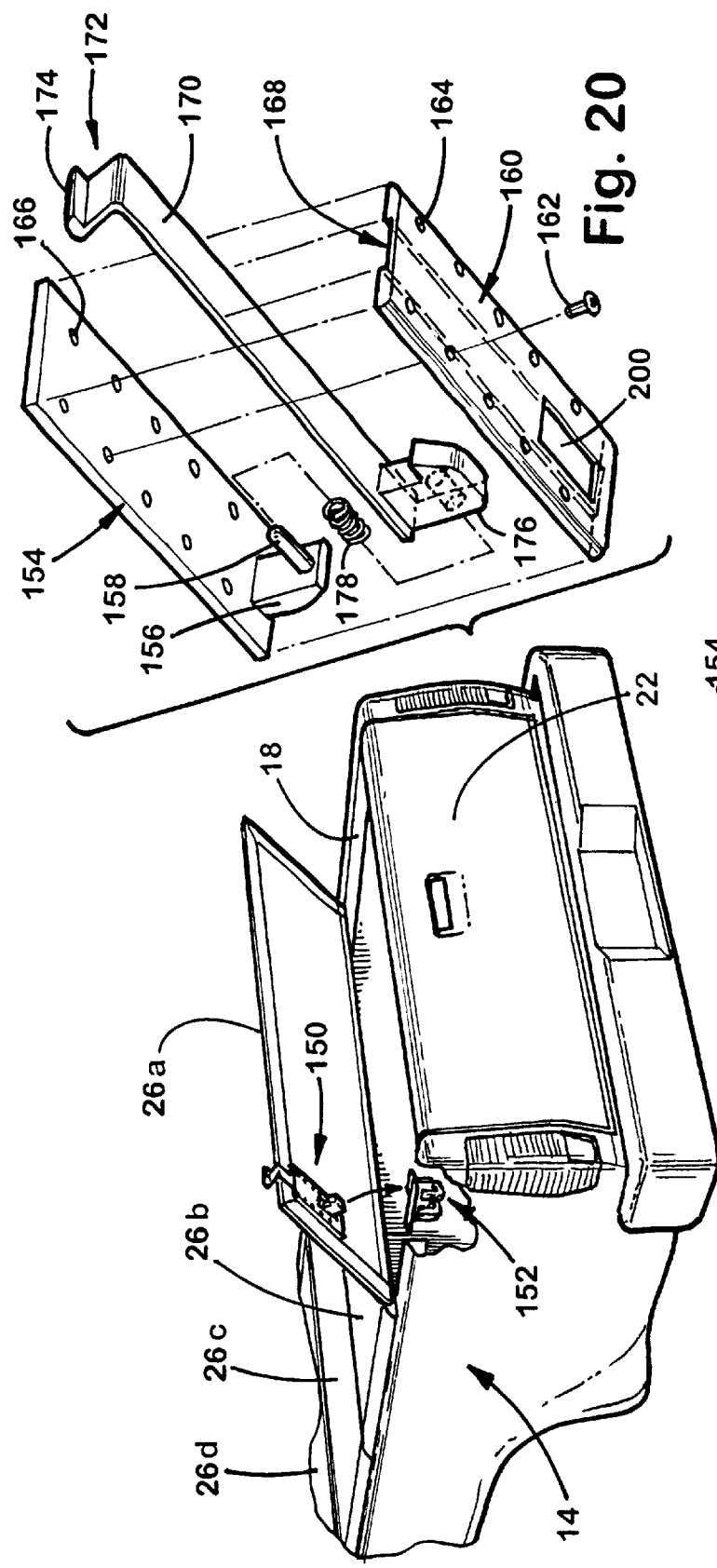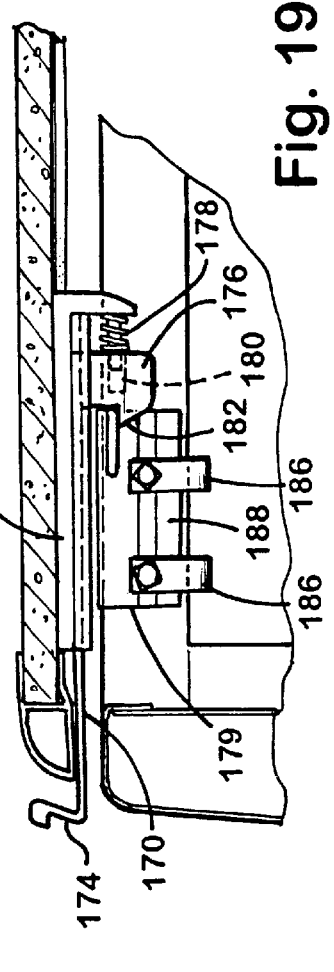

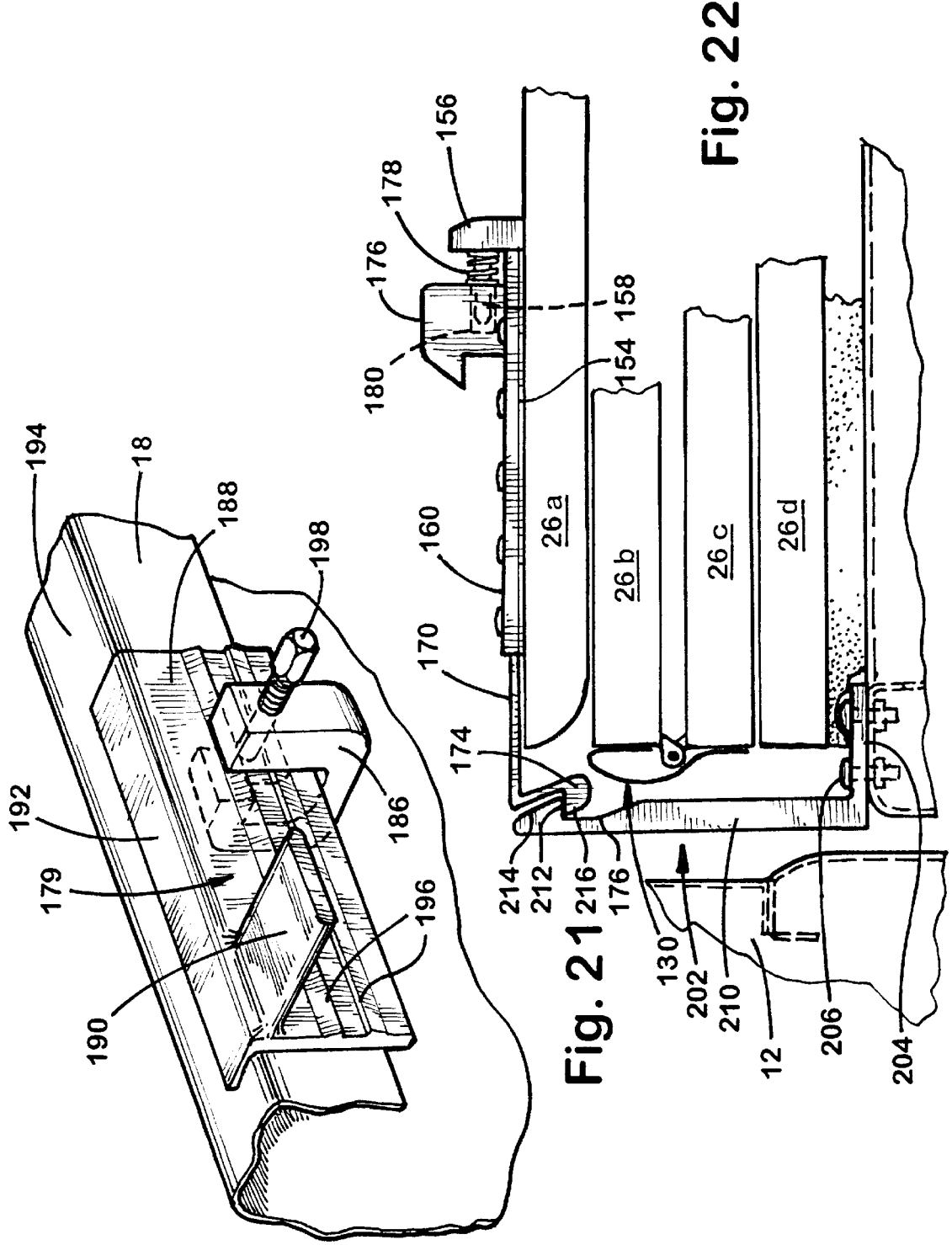

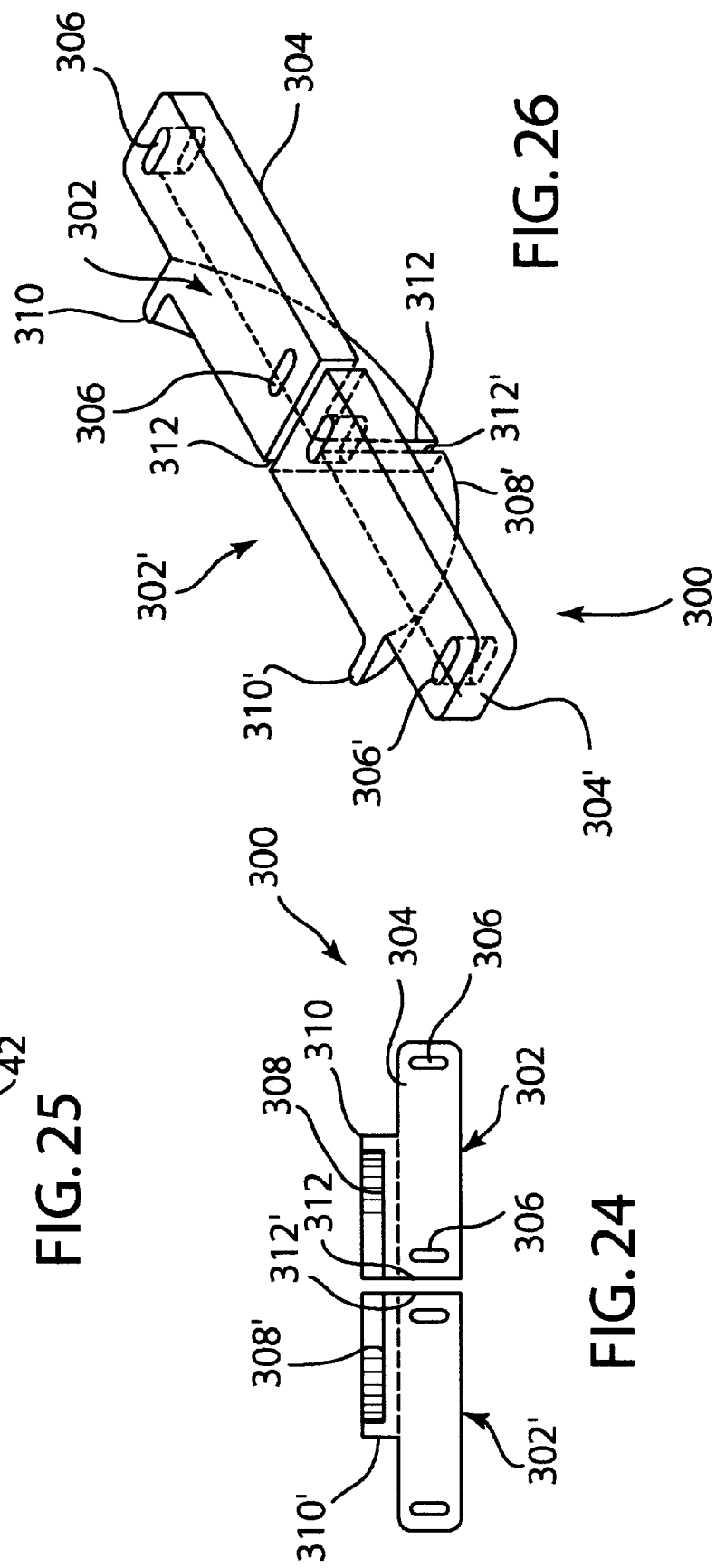
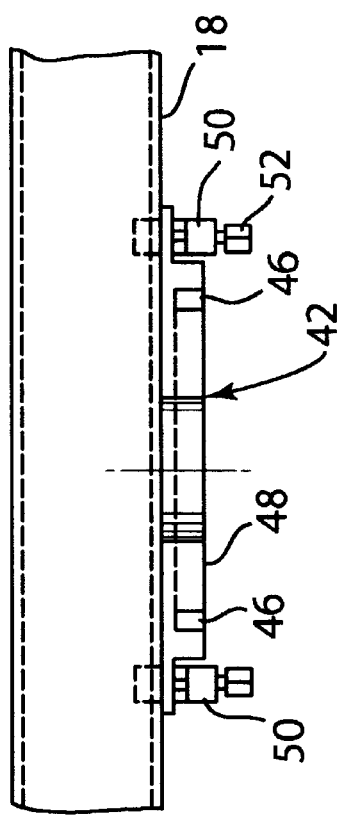
FIG. 25
FIG. 24
FIG. 26

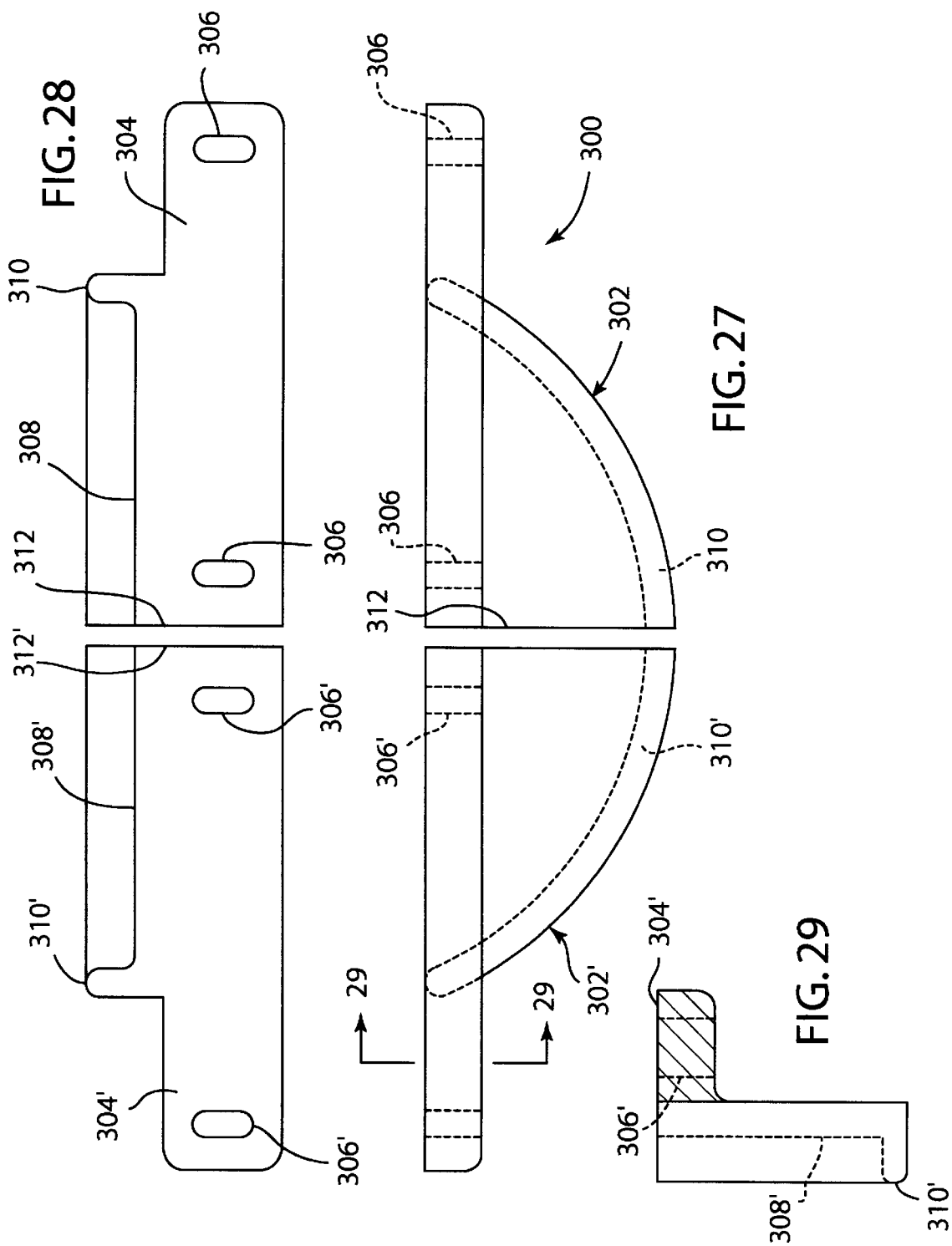

US 6,352,296 B1

FOLDING COVER FOR PICKUP TRUCK BED

CROSS-REFERENCES TO RELATED APPLICATIONS

This is a continuation-in-part of applicant's U.S. patent application Ser. No. 09/067,668, filed Apr. 28, 1998 now abandoned and entitled Folding Cover for Pickup Truck Bed.

STATEMENT REGARDING FEDERALLY SPONSORED RESEARCH OR DEVELOPMENT

Not Applicable

FIELD OF THE INVENTION

The present invention relates to a folding cover for a pickup truck bed employing improved latching, sealing, and attachment features.

BACKGROUND OF THE INVENTION

A number of folding covers have been developed for covering pickup truck beds. Applicant's prior U.S. Pat. Nos. 4,844,531 and 4,946,217 (which are incorporated by reference) disclose the general construction and operation of such products. In these products, the front panel, or the panel closest to the cab of the pickup truck, is usually fastened down securely and serves as an anchor for the remaining panels of the cover. The disadvantage with this construction is that the front panel cannot be moved for access purposes, and the space underneath the front panel is difficult to gain access to, and in any event, requires folding all of the rearward sections forwardly to do so. Applicant's U.S. Pat. No. 5,653,491 discloses one method for providing a front panel that can be opened while at the same time retaining the cover assembly in a fixed position on the pickup truck bed.

An object of the present invention is to provide an easily removable folding pickup bed cover with an improved mechanism for opening either of the front two panels, while at the same time holding the panel assembly in its proper position on the pickup truck bed.

Other objects of the present invention are to provide an improved seal for the junctions between adjacent panels, and to provide an improved latch mechanism that not only latches the rear panel downwardly, but also holds the panels in a stack when folded forwardly to the front of the pickup truck bed.

BRIEF SUMMARY OF THE INVENTION

In accordance with the invention, a folding cover for a pickup truck bed comprises at least two panels that are connected together at a hinge axis that permits each panel to be lifted up and folded over toward the top of the other panel. An attachment mechanism for retaining the panels in position on the pickup truck bed while permitting the panels to fold comprises an arcuate track and follower mechanism interconnecting one panel with the pickup truck bed. The track and follower mechanism defines an arcuate path that permits either panel to open while holding that cover in a fixed transverse and longitudinal position on the pickup truck bed. The track and follower mechanism holds the cover in its proper position on the pickup truck bed when either panel is opened.

In one aspect of the present invention, the track and follower mechanism comprises an arcuate track mounted on the pickup truck bed, and an arcuate follower attached to a front panel of the cover, with the arcuate follower being constrained to move along the arcuate path of the track as the front cover is opened.

In a preferred practice of the present invention, separate followers are attached to both of the two panels, so that either panel can be opened completely until the follower thereof is disengaged from the track, while the follower of the other panel holds the panel assembly in position on the pickup truck bed. Desirably, the followers are arcuate members. With this embodiment, the entire folding cover can easily be removed and reinstalled on the pickup truck bed simply by folding both covers up simultaneously so as to be disengaged from the track.

In another aspect of the present invention, the gap between adjacent panels is sealed from moisture penetration by a unique S-shaped or accordion-shaped seal, which is attached on one end to the edge of one panel and is attached at the other end to the edge of the adjacent panel, preferably by a pressure-sensitive adhesive. The seal expands and collapses in accordion fashion as the panels are pivoted relative to each other, and when the panels lay flat on the pickup truck bed, the seal fills the space between the panels and forms an enlarged bead above the junction between the panels.

Another aspect of the present invention is an improved panel latch mechanism that serves both as a latch for the rearmost panel and as a latch to hold the panels together when they are folded in a stack at the front of the pickup truck bed.

These and other features of the present invention are described in detail below and shown in the appended drawings.

BRIEF DESCRIPTION OF THE SEVERAL VIEWS OF THE DRAWING

FIG. 1 is a perspective view of a pickup truck employing a folding cover in accordance with the present invention.

FIG. 2 is a sectional side elevational view of the pickup truck and cover of FIG. 1.

FIG. 3 is a sectional side elevational view showing the attachment mechanism for attaching the front panel of the cover to the pickup truck bed while permitting the front panel to be opened.

FIG. 4 is a side elevational view of the attachment mechanism of FIG. 3, showing the front cover in an open position.

FIG. 5 is a perspective view showing the track of FIGS. 3 and 4 attached to the pickup truck bed.

FIG. 6 is a sectional view taken along lines VI—VI of FIG. 5.

FIG. 7 is a plan view of the track mechanism of FIG. 3 attached to the sidewall of the pickup truck bed.

FIG. 8 is a perspective view of the follower mechanism of the attachment mechanism of FIGS. 3 and 4.

FIG. 9 is a plan view of the follower mechanism of FIG. 8.

FIG. 10 is an exploded perspective view showing a follower employed in a second embodiment of the attachment mechanism of the present invention.

FIG. 11 is a perspective view of a track mechanism employed with the second embodiment of the attachment mechanism of the present invention.

FIG. 12 is an exploded perspective view of a third embodiment of an attachment mechanism in accordance with the present invention.

FIG. 13a is a cross-sectional view taken along lines XIVa—XIVa of FIG. 13.

FIG. 15 is a side elevational view of the attachment mechanism of FIG. 12, showing the front panel completely opened and folded over against the top of the adjacent panel.

FIG. 16 is a sectional side elevational view showing the improved seal mechanism of the present invention, with the panels being rotated away from a co-planar position.

FIG. 17 is a side elevational view of the embodiment of FIG. 16, with the panels positioned in a flat, co-planar position.

FIG. 18 is a perspective view of the improved latch mechanism of the present invention mounted on the rear panel of a cover positioned on a pickup truck bed.

FIG. 19 is a sectional side elevational view of the latch mechanism of FIG. 18 in position to hold the rear cover downwardly on a pickup truck bed.

FIG. 20 is an exploded view of the components of the latch mechanism of FIG. 18.

FIG. 21 is a perspective view of the strike mechanism of the latch mechanism of FIG. 18.

FIG. 22 is a side elevational view showing the manner in which the latch mechanism of FIG. 18 is employed to latch stacked panels downwardly at the front of the pickup truck bed.

FIG. 24 is another embodiment of the panel attachment mechanism of the present invention, wherein the follower mechanism comprises a separate follower elements attached to each panel.

FIG. 25 is the same as FIG. 7 and discloses the track mechanism employed with the follower mechanism of FIG. 24.

FIG. 26 is a perspective view of the follower mechanism of FIG. 24.

FIG. 27 is a side elevational view of the follower mechanism of FIG. 24.

FIG. 28 is a plan view of the follower mechanism of FIG. 24.

FIG. 29 is a sectional view taken along lines 29—29 of FIG. 27.

DETAILED DESCRIPTION OF PREFERRED EMBODIMENTS

Figure 13:
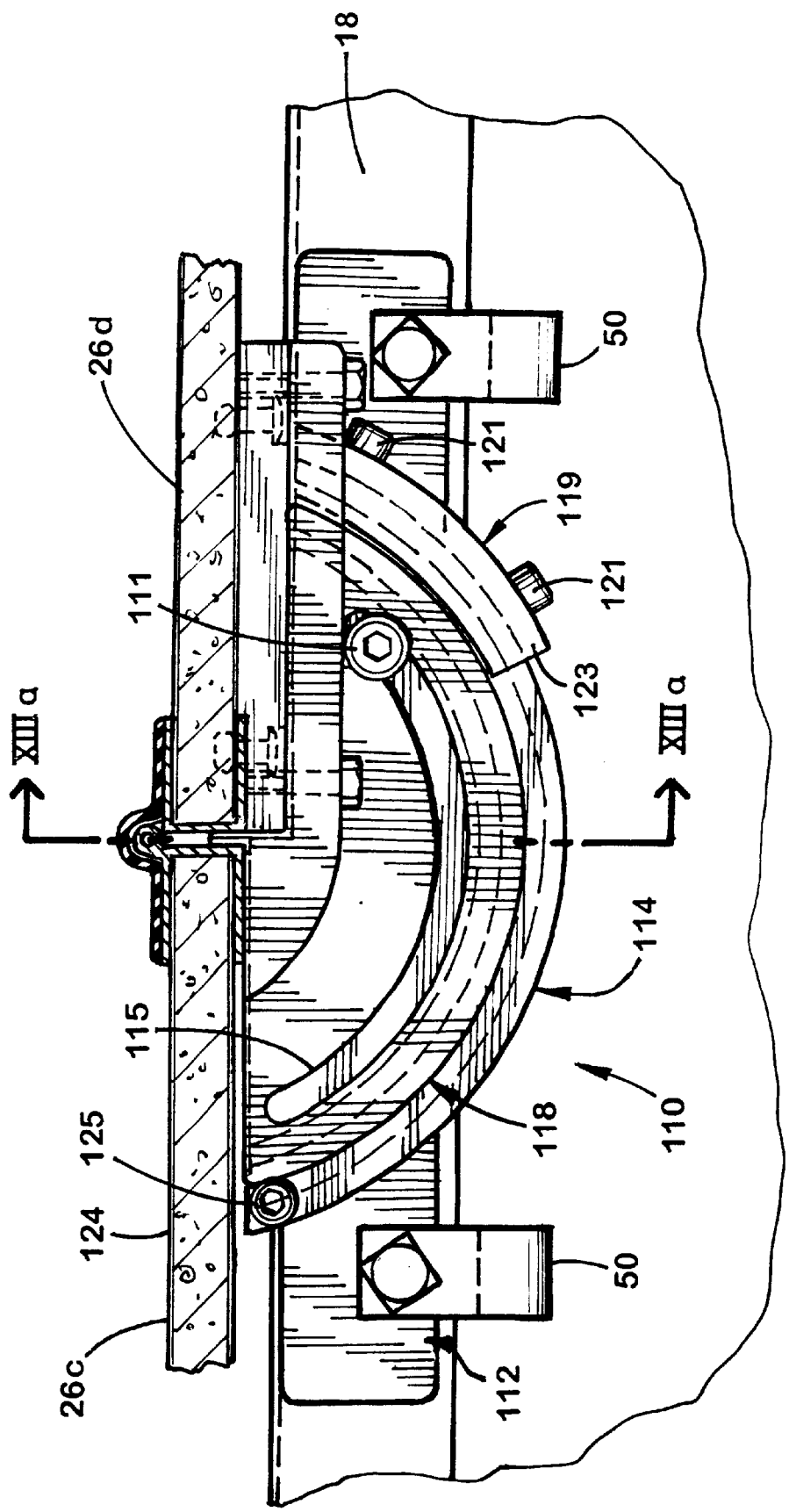
FIG. 13 is a side elevational view of the attachment mechanism of FIG. 12, showing the panels in a closed position.

Referring to the drawings, a pickup truck 10 having a cab 12 and a bed 14 employs a folding cover 16 in accordance with the present invention. The bed of the pickup truck includes sidewalls 18, a front wall 20, and a rear wall 22, which is a tailgate that opens. The bottom of the bed comprises a floor 24.

Cover 16 comprises a plurality of substantially rigid panels 26a, 26b, 26c, and 26d that extend transversely across the pickup truck bed. The panels are hinged together by hinges 32, 37, and 39 that permit the panels to be folded together in accordion fashion to uncover the pickup truck bed. The present invention is disclosed for exemplary purposes with the preferred construction of four panels. However, different numbers of panels could be employed. When the pickup truck bed is uncovered by folding the panels, the panels are folded toward the front of the pickup truck bed and form a stack on panel 26d at the front of the bed (FIG. 22).

Panels 26a–26d are similar in configuration and desirably are configured in the same manner as the panels of applicant's co-pending patent application, Ser. No. 08/888,685, filed Jul. 7, 1997, entitled FOLDING COVER FOR PICKUP TRUCK BED now U.S. Pat. No. 5,931,521, which is incorporated herein by reference. The panels are formed of flat rectangular members 28 formed of fiberglass, honeycomb, or other building material. The edges of the panels are enclosed by channel-shaped frame members 30. Adjacent panels are interconnected by hinges, such as hinge 32, which pivot about a hinge pin 36, forming the pivot or hinge axis of the hinge. The hinges can either be incorporated into the panel frames, as in the above-identified co-pending patent application, or the hinges can have separate hinge leaves that are attached to opposing side edges 34 of the panels. The axes of the hinges are positioned alternatively adjacent the upper surface of the panels and the lower surface of the panels, as shown in FIG. 2, in order to permit the panels to fold in accordion fashion in order to uncover the pickup truck bed.

The manner in which the front panel is attached to the pickup truck bed while still permitting the front panel to open and close is shown in FIGS. 3–6. An attachment mechanism 40 mounted on each side of the pickup truck bed comprises a track mechanism 42 mounted to the pickup truck bed, preferably to the sidewall 18, and a follower mechanism 44, which rides in the track and follows the arcuate path of the track.

As shown in FIGS. 5–7, track 42 comprises an arcuate groove 46 in a flat plate 48 that is attached to the inner sidewall 18 of the pickup truck bed by means of C-clamps 50. The manner in which this C-clamp is attached to the sidewall by means of bolt 52 is shown in FIG. 6. The groove 46 has a rectangular cross-section, with an open side facing inwardly into the pickup bed.

As shown in FIGS. 8 and 9, follower 44 comprises an arcuate plate member 54 having an arcuate projection 56 thereon that fits in groove 46 in track 42. Arcuate member 54 is attached at one end to a mounting flange 58, which has transversely slotted openings 60 therein for mounting the follower on the underside of front panel 26d adjacent the junction between panels 26d and 26c. An upwardly extending ridge 62 fits between the two panels and accurately positions the follower mechanism.

The follower is attached to the underside of the front panel by means of a plate 64 which is riveted to the underside of the front panel by rivets 66, as shown in FIG. 3. Plate 64 has threaded openings 68 therein that receive bolts 69 to hold flange 58 to the mounting plate 64. The slotted openings 60 in flange 58 make it possible to move the projection 56 of the follower mechanism inwardly and outwardly in order to achieve a proper fit in groove 46. The C-clamps holding track 42 to the sidewall of the pickup truck bed can be loosened in order to move the track into proper alignment position on the sidewall.

As shown in FIGS. 3 and 4, follower 44 is constrained to ride in groove 46 of track 42, even as the front panel is raised. The interengagement of the follower in the track maintains the proper orientation of the front panel on the pickup truck bed, even when the front panel is raised and lowered. A chain or cable 70 attached by a mounting bar to the sidewall of the pickup truck bed and attached to the underside of front panel 26d by an appropriate fitting 74 limits the backward movement available for the front door and prevents the follower from completely disengaging from the track. If these components disengage, the cover is no longer retained securely on the front end of the pickup truck bed. As indicated in the drawings, the front panel rotates about the hinge axis 36 of hinge 32. The arc formed by the track and follower are configured and positioned so that they represent the arc of a circle having hinge axis 36 as a center point. This permits the relative rotation of the follower and track through a circular arc as the front panel is opened.

Another embodiment of the attachment mechanism is shown in FIGS. 10 and 11. In this embodiment, the follower 80 is an arcuate plate 82 having a T-shaped flange 84 on the outer periphery thereof. Plate 82 is attached to a follower mounting flange 86, which is in turn attached to a panel mounting plate 88. Like the previous embodiment, panel mounting plate 88 is attached to the underside of the front cover by rivets 90, and flange 86 is attached to mounting plate 88 by bolts 92 which fit through elongated slots or openings 94 in flange 86 and thread into threaded openings 96 in panel mounting plate 88.

Track 98 comprises a plate 99 having an arcuate C-shaped channel 100 therein. The channel has a generally rectangular cross-section and has a slot 102 in an upper sidewall, with flanges 104 being positioned on each side of slot 102. The interior 106 of track 98 is thus open and forms a T-shaped interior that receives the flange 84 of follower 80. An L-shaped flange or other shape having an enlarged end that is trapped in an arcuate groove would accomplish the same function. Similarly, it is not necessarily required that both the track and the follower have continuous arcuate exterior surfaces. A follower of a shorter length that provides an engaging member that is constrained to ride in an arcuate path would work. Similarly, the track could be attached to the underside of the front panel and the follower could be attached to the sidewall of the pickup truck bed.

Still another embodiment 110 of the attachment mechanism is shown in FIGS. 12–15. In this embodiment, a fixed position track 112 is mounted on the sidewall of the pickup truck bed in the manner described for the previous embodiments. This embodiment, however, includes an intermediate arcuate plate member 114 having an arcuate projection 127 on one side that rides in a groove 116 in track 112. Similarly, a follower 118 mounted on the underside of front panel 26d has an arcuate flange 120 that rides in a groove 122 in intermediate member 114.

Follower 118 is slidably held to plate 114 by a bolt 111, which extends through an arcuate slot 115 in follower 118 and is threaded in opening 113 in plate 114. The bolt permits relative movement between the members but stops the movement before the members disengage.

Intermediate member 114 is slidably held on track 112 by bracket 119, formed of a plastic resin, which is mounted on track 112 by screws 121. A flange 123 on bracket 119 fits over the edge of member 114. This serves to hold the members together and also limits the range of arcuate movement of the members. Screw 125 engages flange 123 to prevent disengagement of the two members.

Figure 14:
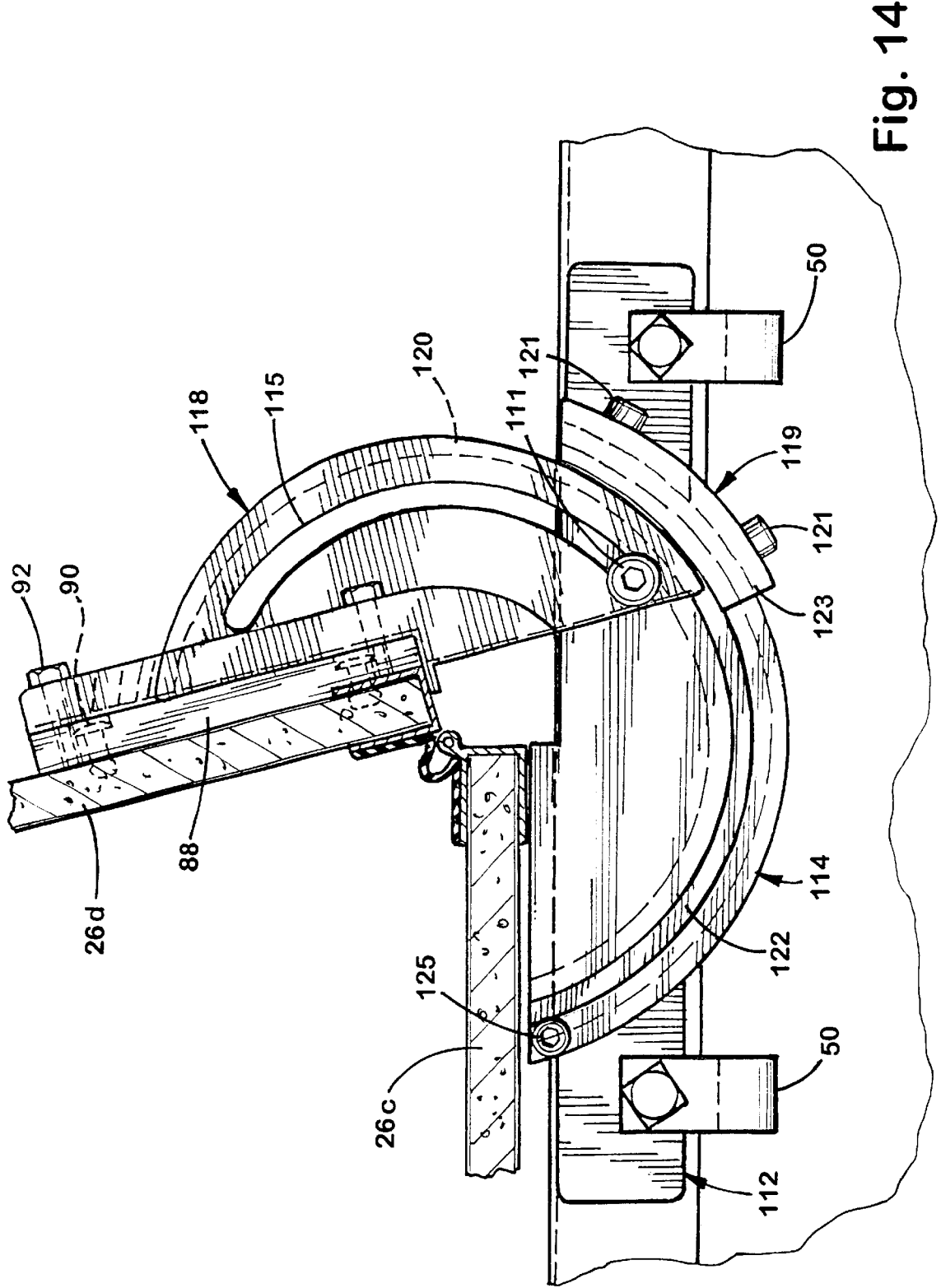
FIG. 14 is a side elevational view of the attachment mechanism of FIG. 12, showing the front panel in a partially raised position.

With this construction, it can be seen in FIG. 14 and FIG. 15 that as front cover 26d is raised, follower 118 rotates with respect to one intermediate member 114 and intermediate member 114 rotates with respect to track 116. As shown in FIG. 15, this makes it possible for front panel 26d to fold all the way rearwardly and to contact with the top 124 of panel 26c without disengagement of the follower from the track members. Even when follower 118 is completely separated from track 112, intermediate member 114 retains the members in engagement with each other and thus holds the front of the panel system downwardly in proper position on the front of the pickup truck bed.

Another aspect of the present invention is shown in FIGS. 16 and 17. In the panel construction of FIGS. 1 and 2, panels 26a and 26b pivot upwardly about hinge axis 37, which is positioned adjacent the top surfaces of the panels. This is the same as the movement of panels 26c and 26d about hinge axis 36. Hinge axis 39, however, between panels 26b and 26c is positioned adjacent the lower surface of the panels so that panels 26b and 26c can pivot downwardly about axis 39.

As shown in FIG. 16, a seal 130 that is especially well adapted to be mounted between panels wherein the hinge axis is at the bottom edge of the panels constitutes a sheet of flexible material 132, such as rubber or the like, which is folded in accordion fashion between the edges 134 and 136 of panels 26b and 26c. One end of the sheet material on one side 140 is attached to edge 134, preferably by means of a pressure-sensitive adhesive. The other end of the sheet material 142 is attached on another side to edge 136, again preferably with a pressure-sensitive adhesive. This leaves an S-shaped configuration to the seal with a portion of the seal between the ends forming a loop or bead 144. As shown in FIG. 17, when the panels are pivoted to a flat position, wherein the panels are co-planar, the sheet material fills the gap between the panels and may even be compressed slightly. In addition, loop or bead 144 fits over the junction between the panels, thus further providing protection against moisture penetration. The sheet material is a flexible sheet material, such as rubber, as previously indicated, with the sheet material being water-impermeable. The sheet material runs the full width of the panel, and thus provides a full width solid sheet of impermeable material protecting the hinge.

This hinge seal could also be employed underneath the hinges between panels 26a and 26b and 26c and 26d, although water would be permitted to penetrate the hinges before coming in contact with the seal.

As can be seen, the S-shaped or accordion-shaped seal expands when the edges of the panels are separated and comes together or compresses when the edges of the panel come together, thus providing a flexible yet water-impermeable connection.

In another aspect of the present invention, a dual function latch 150 is mounted on the underside of rear panel 26a and latches the rear panel downwardly on the pickup truck bed by engagement between the latch and a latch strike 179 mounted on the pickup truck bed, again preferably on the sidewall of the bed.

Latch 150 comprises a mounting plate 154 that mounts on the underside of panel 26a. A spring-retaining flange 156 extends upwardly from the center of one end, with a finger 158 extending outwardly from the flange. An upper plate 160 is fastened on plate 154 by means of fasteners 162 that fit through mating openings 164 and 166 in their respective plates. A groove 168 is formed on the underside of plate 160, and this groove accommodates slide bar 170 of latch member 172 for sliding longitudinal movement of the slide bar in the mounting plates. Slide bar 170 has a cam latch member 174 at an inner end and a cam latch member 176 at an outer end, with the latch member 176 extending downwardly from the slide bar. Desirably latch member 174 extends upwardly from the slide bar.

As shown in FIG. 19, latch member 176 is biased in an outward direction (to the left in FIG. 19) by spring 178, which fits on finger 158 and rides in an opening 180 in the latch member. Latch member 176 has a cam surface 182 on a lower side thereof.

A latch strike 179 is clamped on the sidewall of the pickup truck bed by clamps 186 of the type used for other components. The clamp engages a backing plate 188 and holds an outwardly extending strike plate 190 in position to engage surface 182 of the cam latch. An outwardly extending flange 192 on the upper edge of plate 188 fits on the top 194 of the pickup truck bed sidewall and prevents the latch from moving the strike downwardly on the sidewall when it engages the strike. A pair of ridges 196 run longitudinally along plate 188 in order to properly position screw 198 of clamp 186.

Latch member 176 extends through an opening 200 in plate 160 so that the edges of the opening establish limits for maximum reciprocal movement that the latch is permitted to undertake.

The manner in which the latch operates to hold the rear panel down on the truck bed is shown in FIG. 19. Latch 176 fits under strike plate 190 and holds the latch in place. To release the latch, member 174 is pushed to the left, disengaging the latch from strike 178. The rear panel may then be lifted upwardly.

Figure 23:
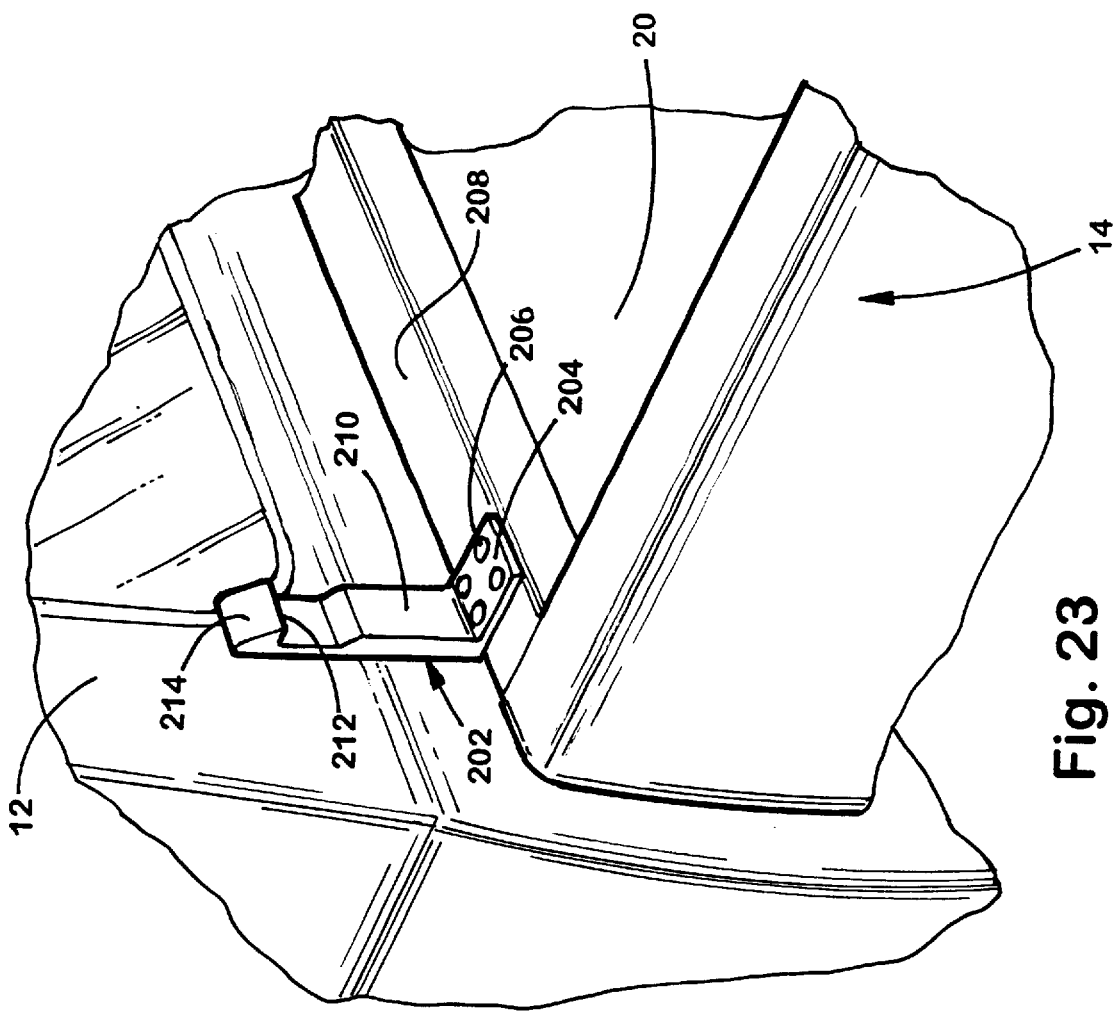
FIG. 23 is a perspective view of the strike mechanism employed at the front of the pickup truck bed to engage the latch mechanism for holding stacked panels in position.

The same latch mechanism serves as a latch for holding the front edge of stacked panels downwardly on the front of the vehicle. As shown in FIGS. 22 and 23, when the panels are folded together, member 174, which serves as the latch handle when the cover is unfolded, now serves as the latch member itself, while member 176 now serves as the handle. When the panels are folded at the front of the pickup truck bed, latch member 174 extends forwardly and a tapered lower outer surface 176 extends upwardly and outwardly. A strike 202 (shown in more detail in FIG. 23) comprises a right angle base 204 fastened by screws 206 or the like to the front edge 208 of the pickup truck bed. Upwardly extending arm 210 has a rearwardly extending tooth 212, with an upper edge thereof having a downwardly and rearwardly extending cam surface 214.

When the covers are folded at the front of the pickup truck bed, surfaces 176 and 214 engage. This causes a cam action forcing member 174 to move rearwardly against the spring pressure of spring 178, until an outer end 216 of member 174 engages the underside of ridge projection 212. The engagement of the latch 174 with the strike 202 securely holds the panels downwardly at the front of the truck bed and prevents them from catching the wind and unfolding as the vehicle is driven.

In order to release the latch, member 176 is slid rearwardly, and this disengages the latch member 174 from the projection 212. Thus, the same latch mechanism serves to hold the rear panel downwardly on the rear of the car and the stacked panels downwardly at the front of the pickup truck bed.

Another embodiment of the attachment mechanism of the present invention is shown in FIGS. 24–34. This embodiment is especially preferred for two panel covers.

This embodiment employs a track 42 (FIG. 25) that is the same as the track employed in the first embodiment of the invention, with FIG. 25 being the same as FIG. 7 and the parts being numbered the same. The track 42 of FIG. 25 is shown adjacent follower mechanism 300 in FIG. 24 to illustrate the manner in which the parts fit together.

Referring to FIG. 24, follower mechanism 300 comprises two separate follower elements 302 and 302'. These elements are identical, except that one element is the mirror image of the other. For convenience, only one of the two elements is described in detail herein. The same numbers are employed for both follower elements, with the numbers of one of the follower elements being primed.

Follower element 302 comprises a mounting flange 304 having transversely slotted openings 306 therethrough for mounting the mounting flange to a panel. An arcuate plate 308 is mounted on the side of mounting flange 304 and extends downwardly therefrom. An arcuate ridge projects outwardly from plate 308 so as to be in alignment with arcuate slot 46 in track 42, when mounted on the underside of a cover panel. Arcuate ridge extends through an angle of somewhat less than 90° and terminates at edge 312 of the follower element. Edge 312 is designed to be positioned vertically and immediately opposite edge 312' of element 302' when the cover is closed. The arc of ridge 310 is the arc of a circle having its central axis as the hinge axis of the hinge interconnecting the panels, and this arc is designed to mate with the arc of groove 46. Ridge 310 extends through an arcuate angle of less than 90°, desirably extending from the upper surface of mounting flange 304 to vertical edge 312.

Figure 30:
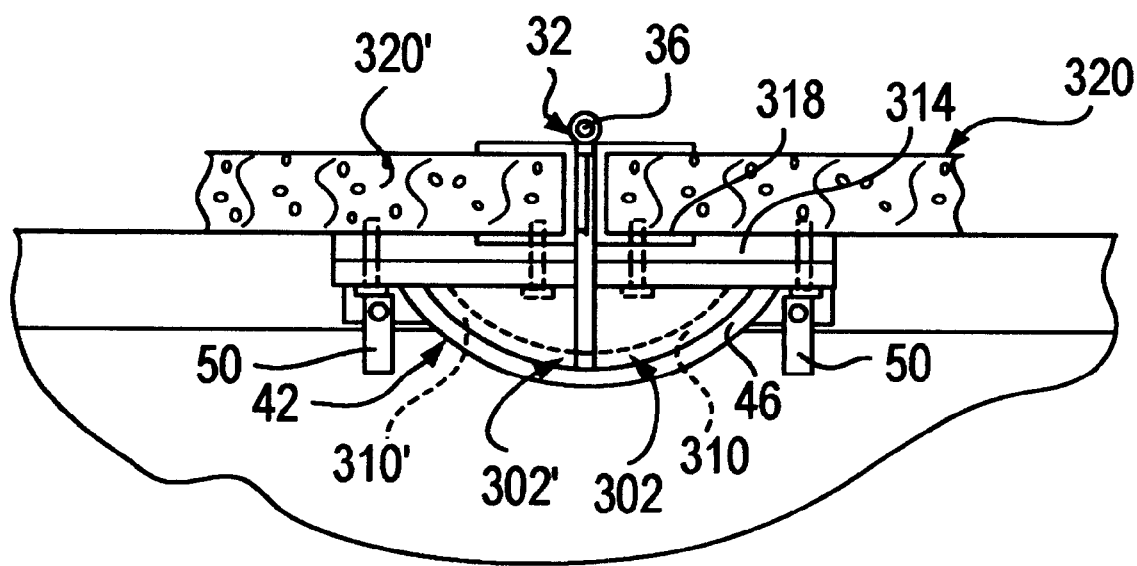
FIG. 30 is a fragmentary side-elevational view of a cover attached to a pickup truck bed employing the attachment mechanism of FIGS. 24 and 25, shown with the cover closed.

Follower elements 302 and 302' are mounted opposite each other on the underside of adjacent cover panels in the manner shown in FIG. 24 and FIG. 30. The follower elements are mounted on the panels by means of a mounting plate 314, shown in detail in FIG. 33. Mounting plate 314 is a rectangular plate formed of a molded resin that fits between the mounting flange 304 of follower element 302 and the underside of panel 320, which in this case is the front panel of a two panel system. The panels could be reversed, and the panels could run sideways on the pickup truck bed as well. Since the panels are substantially the same, the second panel employs the same numbers as the first panel, except that the numbers are marked with a prime. Mounting plate 314 has a recessed upper edge 316 which fits over flange 318 of panel 320. Mounting plate 314 is approximately twice as wide as mounting flange 304. Mounting plate 314 is riveted to the underside of the panel in five places through recessed rivet holes 318. The rivets are not shown. The mounting flanges of the follower elements are screwed into the mounting plate through openings 306 in the follower mounting flanges and openings 320 in the mounting plate. The mounting plate is formed so that it can be used on either side of the panel and on either panel.

Figure 31:
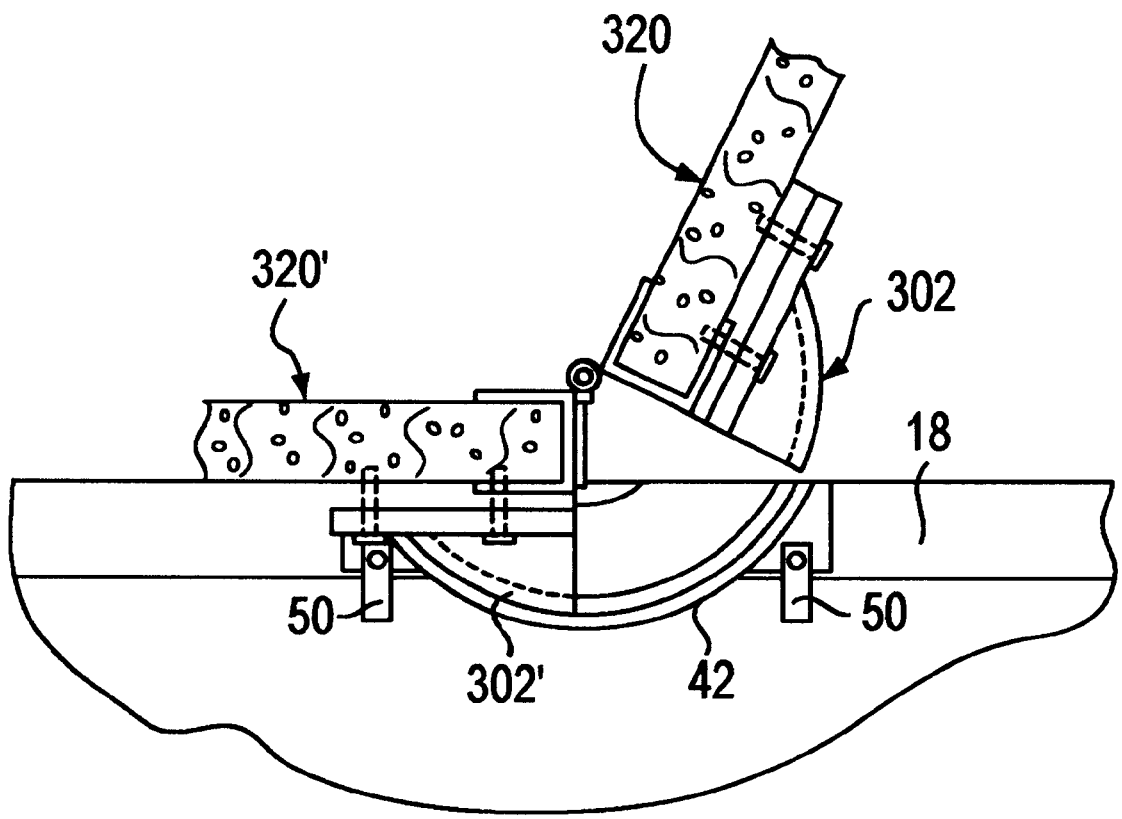
FIG. 31 is a fragmentary side-elevational view of the cover of FIG. 30, showing the front panel in a raised position with the follower mechanism of the front panel detached from the track mechanism.
Figure 32:
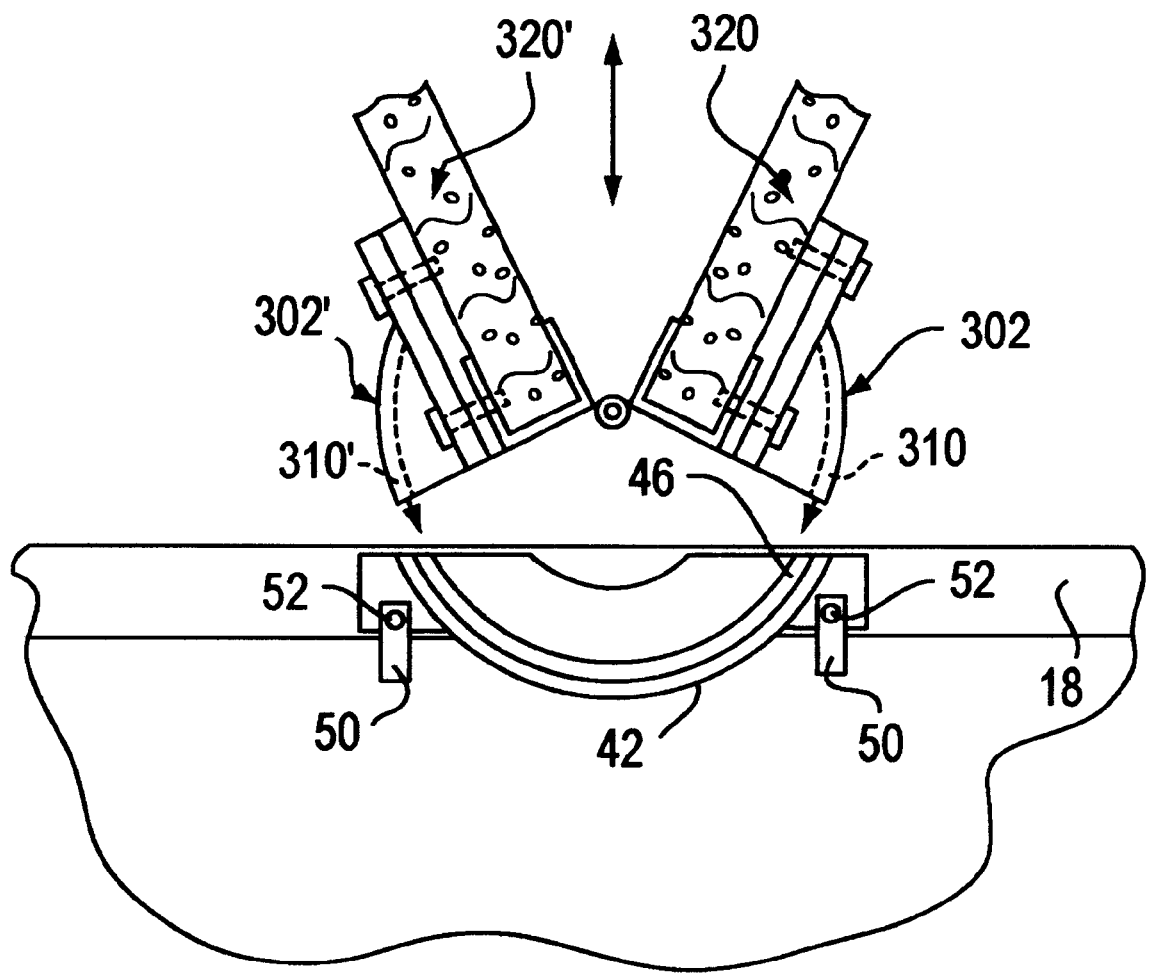
FIG. 32 is a fragmentary side-elevational view of the cover of FIG. 30, shown with both panels raised and the followers of both panels detached from the track mechanism such that the cover is disengaged from the track mechanism for removal from the pickup truck bed.
Figure 33:
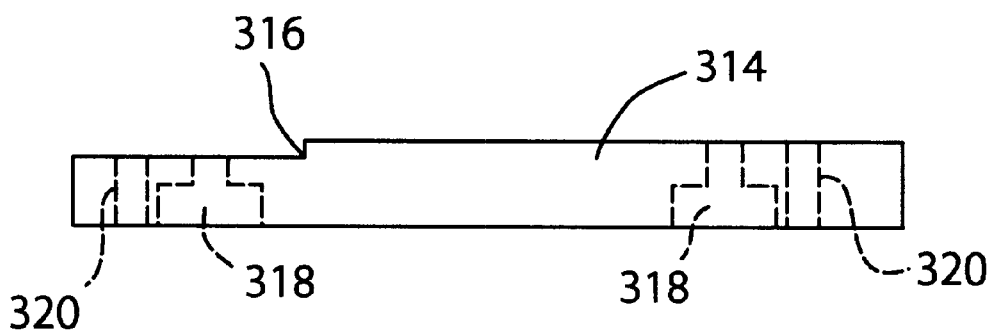
FIG. 33 is a side-elevational view of a mounting plate employed for mounting the follower mechanism of FIGS. 24–32 to the underside of a folding panel.
Figure 34:
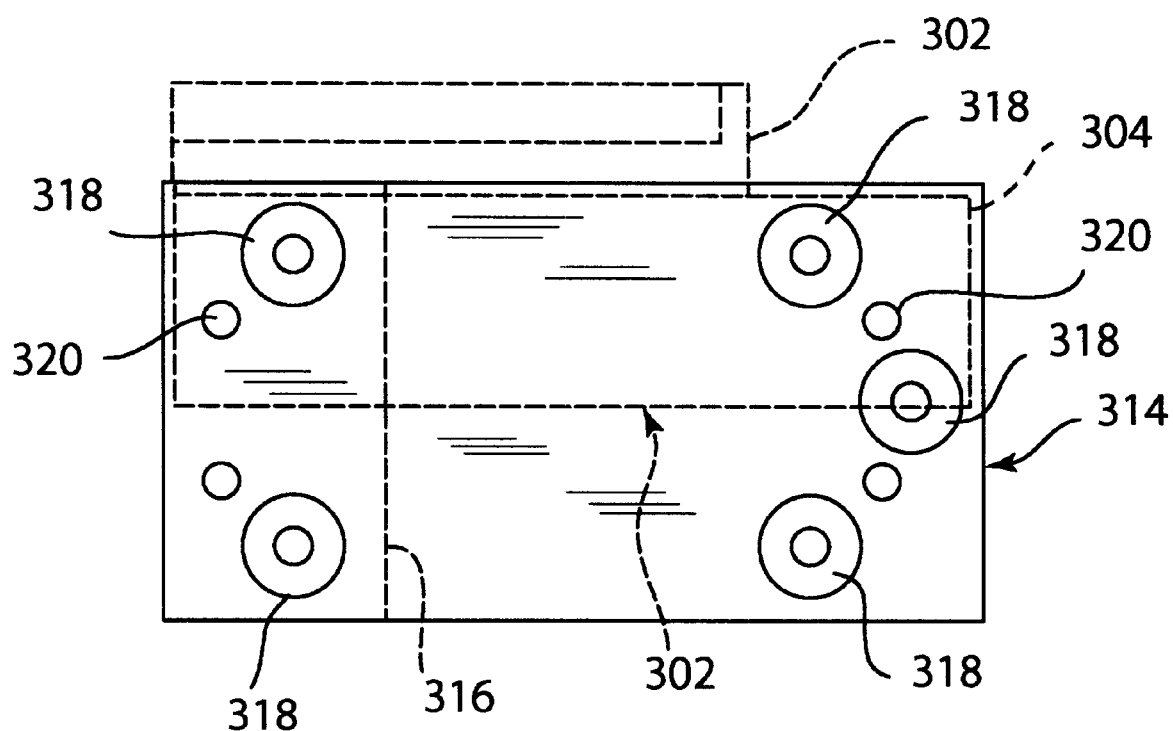
FIG. 34 is a plan view of the mounting plate of FIG. 33.

The manner in which the attachment mechanism of this embodiment works is shown in FIGS. 30–32. In FIG. 30, panels 320 and 320' are shown in a fully closed position.

When in this position, both follower elements 302 and 302' have their arcuate ridges 310 and 310' engaged in arcuate groove 46 of track 42, thus securely holding both the panels 320 and 320' in position and restraining the cover from sliding on the pickup truck bed.

When panel 320 is raised to the point where follower element 302 becomes disengaged from track 42, as shown in FIG. 31, follower element 302' still remains in engagement with track 42 and thus holds the cover in place and prevents the cover from sliding on the pickup truck bed. The arcuate engagement between the follower and the track prevents both longitudinal and vertical movement of the track. The fact that the followers are positioned adjacent the sidewalls of the pickup truck bed prevents the cover from sliding sideways. The clamps 50 holding the track to the sidewall 18 of the truck permit lateral adjustment of the attachment mechanism for proper longitudinal placement of the cover on the bed. Slotted openings 306 in the follower mounting flange permit lateral adjustment of the followers so as to properly position the cover on the pickup truck bed.

An important feature of the present invention is that the two element follower mechanism makes it possible to easily remove and reinstall the cover on the pickup truck bed without disassembling any of the clamps after they have been adjusted for proper position. As shown in FIG. 32, when both panels 320 and 320' are lifted upwardly to the point where followers 302 and 302' are both disengaged from track mechanism 42, the cover can simply be lifted off the pickup truck bed. Reinstallation involves the opposite procedure of placing the folded cover on the bed so that ridges 310 and 310' are in alignment with arcuate groove 46 in the track mechanism. The cover is then lowered and closed to reinstall the cover on the pickup truck bed. This is a distinct improvement over prior covers, wherein it is necessary to release a clamping mechanism in order to remove the cover. This requires readjusting the clamping mechanism when the cover is reinstalled.

It should be understood that the foregoing is merely representative of the preferred practice of the present invention and that various modifications and changes may be made in the arrangements and details of construction of these embodiments without departing from the spirit and scope of the present invention, as defined in the appended claims.

What is claimed is:

1. A folding cover for a pickup truck bed comprising at least two panels that are pivotally connected together at a hinge axis that permits each panel to be opened by being lifted up and folded over toward a top of the other panel, the improvement comprising an attachment mechanism for restraining the cover from sliding on the pickup truck bed while permitting both panels to fold, the attachment mechanism comprising a track and follower mechanism interconnecting the panels with the bed, the track and follower mechanism defining an arcuate path that generally follows the arc of a circle having the hinge axis as a central axis, the track being attachable to the pickup truck bed by one or more fasteners and a follower being attached to each of the panels, the track and followers fitting together such that the followers are constrained to follow the arcuate path between open and closed positions of their respective panels, the attachment mechanism retaining the cover in position on the pickup truck bed while at the same time permitting both panels to be opened and closed, the followers becoming disengaged from the track when their respective panels are lifted upwardly a predetermined arcuate distance, both panels of the cover being completely disengaged from the pickup truck bed when both panels are lifted upwardly the predetermined arcuate distance at the same time, thereby permitting easy removal and installation of the cover.

2. A folding cover according to claim 1 wherein the track and follower mechanism comprises arcuate follower members attached to each cover panel on each side of the cover adjacent opposite ends of the panel hinge, an arcuate track member being attached to the pickup truck bed adjacent the follower members, the track and follower members having interfitting components that constrain the followers to follow the arcuate path.

3. A folding cover according to claim 2 wherein the track comprises an arcuate groove facing transversely across the pickup truck bed, and the follower comprises an arcuate ridge that fits in the groove.

4. A folding cover according to claim 1 wherein the arcuate path of the track extends through an arc that extends from an upper edge of a truck bed sidewall downwardly along an inside surface of the truck bed sidewall and then back up to the upper edge of the truck bed sidewall, the followers each extend through an arcuate path that extends through an arc of no more than 90°, such that the cover can be disengaged from the track by lifting both panels upwardly until the followers disengage from the truck.

5. A folding cover according to claim 1 wherein the cover has only two panels.

\* \* \* \* \*